(12) United States Patent
Moreau et al.

(10) Patent No.: US 6,221,492 B1
(45) Date of Patent: Apr. 24, 2001

(54) ELLIPSOIDAL ADSORBENT PARTICLES AND THEIR USE IN A GAS PRODUCTION PROCESS

(75) Inventors: Serge Moreau, Velizy-Villacoublay; Jacques Labasque, Versailles, both of (FR)

(73) Assignee: L'Air Liquide, Societe Anonyme pour l'Etude et Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/215,521

(22) Filed: Dec. 18, 1998

(30) Foreign Application Priority Data

Sep. 23, 1998 (FR) .................................................. 98 11857

(51) Int. Cl.$^7$ ............................. B32B 5/16; B01D 53/047
(52) U.S. Cl. .............................. 428/402; 95/96; 428/680; 428/689; 428/702; 428/703
(58) Field of Search ..................................... 428/402, 220, 428/212, 688, 689, 702, 703; 252/861; 604/385.1; 95/96

(56) References Cited

U.S. PATENT DOCUMENTS

| | | | |
|---|---|---|---|
| 5,268,162 | * 12/1993 | Ishida et al. ........................ | 423/704 |
| 5,385,718 | * 1/1995 | Casci et al. ......................... | 423/718 |
| 6,004,584 | * 12/1999 | Peterson et al. .................... | 424/489 |

FOREIGN PATENT DOCUMENTS

| | | |
|---|---|---|
| 6-170232 | 6/1994 | (JP) . |
| WO 97/17132 | 5/1997 | (WO) . |

\* cited by examiner

*Primary Examiner*—Hoa T. Le
(74) *Attorney, Agent, or Firm*—Young & Thompson

(57) ABSTRACT

Aggregated absorbent particles having a shape similar to an ellipsoid, which has a first axis (A—A) of length (a), a second axis (B—B) of length (b) and a third axis (C—C) of length (c), the first, second and third axes being orthogonal. The lengths of the first, second and third axes are such that: $a > b \geq c$, and the ratio (a/b) of the length (a) of the first axis (A—A) to the length (b) of the second axis (B—B) is such that: $1.05 < a/b < 2.50$. These aggregated absorbent particles are used in a gas production unit, in particular a PSA unit with radial geometry, for implementing a process of separating a gas flow, such as air or a syngas, with a view to producing, in particular, oxygen with a purity of at least 90%, hydrogen or purified air which can subsequently be separated by cryogenic distillation.

15 Claims, 2 Drawing Sheets

ELLIPSOIDAL ADSORBENT PARTICLES AND THEIR USE IN A GAS PRODUCTION PROCESS

FIELD OF THE INVENTION

The invention relates to adsorbent particles which can be used in a process for separating by adsorption the constituents of a gas flow, such as air, preferably a process of the PSA type, and more particularly of the VSA type.

BACKGROUND OF THE INVENTION

It is known that the gases in air, such as in particular oxygen and nitrogen, are very important industrially.

At present, one of the non-cryogenic techniques used for producing these gases is the technique referred to as PSA (Pressure Swing Adsorption), which encompasses not only PSA processes proper, but also similar processes, such as VSA (Vacuum Swing Adsorption) or MPSA (Mixed Pressure Swing Adsorption) or TSA (Temperature Swing Adsorption) processes.

According to this PSA technique, when the gas mixture to be separated is, for example, air and the component to be recovered is oxygen, the oxygen is separated from the gas mixture using preferential adsorption of at least nitrogen on a material which preferentially adsorbs at least nitrogen and is subjected to cycles of given pressure in the separation zone.

The oxygen, which is adsorbed little or not at all, is recovered at the outlet of the separation zone; it has a purity, in general, of from 90% to 93%.

More generally, a PSA process for the non-cryogenic separation of a gas mixture comprising a first compound which is adsorbed preferentially on an adsorbent material, and a second compound which is less preferentially adsorbed on the adsorbent material than the first compound, with a view to producing the second compound, cyclically comprises at least:

a step of preferentially adsorbing at least the first compound on the adsorbent material, at an adsorption pressure referred to as the "high pressure", with recovery of at least some of the second compound produced in this way;

a step of desorbing the first compound thus trapped by the adsorbent, at a desorption pressure which is lower than the adsorption pressure and is referred to as the "low pressure";

a step of recompressing the separation zone comprising the adsorbent, by changing from the low pressure to the high pressure.

Conventionally, the adsorbent particles are placed in one or more adsorbers, so as to form one or more successive layers of adsorbent within each adsorber.

When an adsorber contains several layers or beds of adsorbent particles, these various beds may consist of particles of the same nature, for example beds of zeolite particles, or of different natures, for example a bed of alumina particles followed by one or more beds of zeolite particles.

Furthermore, the adsorbent beds may be placed horizontally within each adsorber, that is to say being stacked on one another, or vertically, that is to say being juxtaposed with one another according to the so-called radial technique.

Moreover, it is known that the separation efficiency for a gas mixture, such as air, depends on a number of parameters, in particular the high pressure, the low pressure, the type of adsorbent material used and its affinity for the compounds to be separated, the composition of the gas mixture to be separated, the adsorption temperature of the mixture to be separated, the size of the adsorbent particles, the composition of these particles and the temperature gradient set up inside the adsorbent bed.

At present, although it has not been possible to determine a general behavior law, knowing that it is very difficult to connect these various parameters with one another, it is also known that the nature and properties of the adsorbent used have an essential role in the overall efficiency of the process.

Currently, zeolites are the adsorbents most widely used in PSA processes, in particular VSA processes.

The zeolite particles used as aggregated adsorbent in PSA processes are synthesized in very fine powder form, which powder is then aggregated and formed into aggregated particles having a size of the order of from 0.4 mm to several millimeters.

The specific purpose of forming the adsorbent particles is to provide a particulate adsorbent whose geometrical characteristics are compatible with the constraints pertaining to, in particular, mechanical strength and adsorption kinetics which are inherent in the separation process employed.

The industrial fabrication of the adsorbent particles is carried out, for example, by aggregating the zeolite powder using a binder, for example a clay, such as kaolin, attapulgite, bentonite or the like.

There are currently two main forms of adsorbent particles, namely on the one hand cylindrically shaped extrudates and, on the other hand, spheres or beads obtained by accretion. In this regard, reference may in particular be made to the documents D. M. Ruthven, *Principles of adsorption and adsorption processes,* John Wiley & Sons, 1984, p.20, or D. W. Breck, Zeolite Molecular Sieves, John Wiley & Sons, 1974, p.745.

Adsorbents having particular shapes are furthermore also known, for example noncylindrical extruded adsorbents or honeycomb-structure extrudates.

In general, the extruded adsorbent particles known from the prior art are obtained by extruding a paste obtained by mixing zeolite, a binder and water, and optionally additives, such as pore-forming agents or extruding agents, then baking this paste at high temperature, in general at more than 500° C.

However, extruded adsorbents have several drawbacks, namely in particular that their angulated ends promote their attrition when they are being employed, and their very elongate cylindrical geometry facilitates their fracture. Nevertheless, they do in general have a good ratio of their external surface area to their internal volume, which is favorable for the adsorption kinetics.

Spherical adsorbent particles are obtained by accretion from pre-existent particles, called seeds, which are circulated in the presence of binder and zeolite powder while spraying with water, so as to obtain adsorbent spheres by a snowball effect, which adsorbent spheres are then baked at high temperature.

Spherical adsorbent particles of this type generally have good resistance to attrition and crushing, but have a low ratio of their external surface area to their internal volume, which is unfavorable for the adsorption kinetics.

Conventionally, the prior art considers the sphere to be a valid geometrical model for studying diffusion and adsorption phenomena, as mentioned in the document R. T. Yang, *Gas Separation by Adsorption Processes,* Butterworths, 1987, p.168.

Indeed, it can be stated that almost all studies on the diffusion of gases in aggregated zeolite particles are based on the model with spherical symmetry, see in particular D. M. Ruthven, *Principles of adsorption and adsorption processes*, p.235–273.

DESCRIPTION OF THE INVENTION

One object of the present invention is therefore to provide adsorbent particles having characteristics which are improved both from the adsorption kinetics viewpoint and from the mechanical and strength viewpoints.

Another object of the invention is to provide adsorbent particles which can be used in gas separation processes such as PSA processes.

Yet another object of the invention is to provide a process for separating gases, in particular a PSA or VSA process for separating gases from air, employing such adsorbent particles.

SUMMARY OF THE INVENTION

The invention therefore relates to aggregated adsorbent particles having a shape similar to an ellipsoid, the ellipsoid having a first axis (A—A) or main axis of length (a), a second axis (B—B) of length (b) and a third axis (C—C) of length (c), the first axis (A—A), second axis (B—B) and third axis (C—C) being perpendicular, with a>b≧c, the ratio (a/b) of the length (a) of the first axis (A—A) to the length (b) of the second axis (B—B) being such that: 1.05<a/b<2.50.

Depending on the case, the adsorbent particles of the invention may include one or more of the following characteristics:

- they have a shape similar to an ellipsoid of revolution, that is to say b=c;
- they are substantially free of sharp edges;
- the ratio (a/b) is between 1.08 and 2, preferably between 1.10 and 1.5 approximately;
- the contain at least one zeolite or zeolite phase, preferably comprising a type A zeolite or a faujasite, such as X or LSX zeolites. In general, an X zeolite has an Si/Al ratio less than or equal to 1.5. When this Si/Al ratio is equal to approximately 1, such an X zeolite is called an LSX zeolite (for low silica X);
- the contain at least one faujasite exchanged with mono-, di- or trivalent alkali or alkaline earth metal cations, transition metals and/or lanthanides preferably cations selected from the group consisting of lithium, manganese, barium, nickel, cobalt, calcium, zinc, copper, magnesium, strontium and iron cations. It is actually usual for metal cations to be incorporated during the synthesis of zeolite particles and/or inserted into the zeolite structure subsequently by an ion-exchange technique; in general, by bringing unexchanged zeolite particles into contact with a solution of one or more metal salts comprising the cation or cations to be incorporated in the zeolite structure, and subsequent recovery of the particles of zeolite exchanged in this way, that is to say zeolite containing a given quantity of metal cations. The proportion of metal cations introduced into the zeolite structure in relation to the total exchange capacity is called the exchange factor, which is expressed in
- they contain at least one faujasite, preferably X or LSX, containing at least 70% of lithium and/or calcium cations;
- they furthermore contain at least one binder, preferably an inert binder comprising at least one clay, such as kaolin, an attapulgite or a bentonite;
- they contain no binder, such zeolites being commonly called "binderless" zeolites;
- the X zeolite contains at least 85% of $Li^-$ cations, preferably at least 86% and/or at most 96% of $Li^+$ cations;
- the X zeolite contains at least 80% of calcium cations, preferably at least 85% of calcium cations;
- the X zeolite contains at most 15% of $Na^+$ cations, and/or at most 3% of $K^+$ cations;
- the length (a) of the first axis (A—A) is between 0.4 mm and 3 mm, preferably between 0.6 mm and 2.2 mm, more preferentially between 0.8 mm and 1.6 mm;
- the length (b) of the second axis (B—B) is between 0.3 mm and 2.9 mm, preferably between 0.5 mm and 2.1 mm, more preferentially between 0.7 mm and 1.5 mm;
- the length (c) of the third axis (C—C) is between 0.3 mm and 2.9 mm, preferably between 0.5 mm and 2.1 mm, more preferentially between 0.7 mm and 1.5 mm.

The invention furthermore relates to the use of such aggregated adsorbent particles in a process for separating a gas flow, in particular a PSA or VSA process, containing at least a first gaseous compound which adsorbs preferentially on at least the adsorbent particles, and at least a second gaseous compound which adsorbs less preferentially on the adsorbent particles than the first gaseous compound.

The invention also relates to a PSA process, preferably a VSA process, for separating a gas flow, containing at least a first gaseous compound and at least a second gaseous compound, in which:

(a) at least the first gaseous compound is preferentially adsorbed on at least the adsorbent particles according to the invention, and (b) a gas flow containing predominantly the second gaseous compound is recovered.

The gas flow to be separated may, depending on the case, comprise nitrogen and at least one less polar gaseous compound, in particular oxygen and/or hydrogen, and the gas flow is for example air, the first gaseous compound being nitrogen and the second gaseous compound being oxygen.

The air is, in the context of the invention, the air contained inside a building or a heated or unheated enclosure, or ambient air, that is to say air under atmospheric conditions, taken as it is or optionally pretreated.

In this case, an oxygen-rich gas flow is produced and recovered, that is to say one comprising, in general, from 90% to 95% oxygen.

Preferably, the adsorption high pressure is between $10^5$ Pa and $10^7$ Pa, preferably of the order of $10^5$ Pa to $10^6$ Pa, and/or the desorption low pressure is between $10^4$ Pa and $10^6$ Pa, preferably of the order of $10^4$ to $10^5$ Pa.

Furthermore, the temperature of the feed gas flow, that is to say of the flow to be separated, introduced into the adsorber or adsorbers is between 10° C. and 100° C., preferably between 25° C. and 60° C., advantageously of the order of 30 to 40° C.

However, the use of the adsorbent particles according to the present invention is not restricted to the field of producing oxygen from air, and may therefore consequently be applied to the separation of other gas flows, such as in particular to flows containing hydrogen, carbon dioxide and/or carbon monoxide, in particular to the production of synthesis gas or "syngas".

The gas flow to be separated may thus comprise hydrogen and/or CO or $CO_2$, and the gas flow is preferably a syngas, the first gaseous compound being $CO_2$, CO nitrogen or a hydrocarbon, such as methane, and the second gaseous compound being hydrogen.

Furthermore, the adsorbent particles according to the invention may also be used for purifying air with respect to its impurities, in particular such as CO, $CO_2$, water vapor and/or hydrogen, prior to separation or cryogenic distillation of the air thus purified, for example with a view to producing ultrapure nitrogen that can be used, in particular, in the electronics industry or the like.

The invention moreover relates to a gas separation plant capable of implementing a PSA process according to the invention, comprising at least one adsorber, preferably from 1 to 3 adsorbers, characterized in that at least one adsorber contains at least one bed of aggregated adsorbent particles according to the invention.

In particular, the adsorber or adsorbers may have radial geometry.

The present invention also applies to each of the adsorbers of a multibed process.

The invention will now be described in more detail with reference to the appended figures, which are given by way of illustration but without implying any limitation.

The inventors of the present invention have shown that it is possible to improve the kinetic and mechanical characteristics of the zeolite-type adsorbents used in non-cryogenic processes for separating gases, in particular gases from air, when these adsorbents are given a particular geometrical shape, namely an overall ellipsoidal shape.

More precisely, each aggregated adsorbent particle according to the invention has a shape similar to an ellipsoid, preferably an ellipsoid of revolution, with a major axis of length a and with minor axes of length b=c.

In other words, each ellipsoid has a first axis (A—A) or major axis of length (a), a second axis (B—B) of length (b) and a third axis (C—C) of length (c) with a>b≧c, preferably b=c, the said first, second and third axes being mutually orthogonal. The ratio a/b of the length (a) of the axis (A—A) to the length (b) of the axis (B—B) being such that: 1.05<a/b<2.50.

Figure 2:
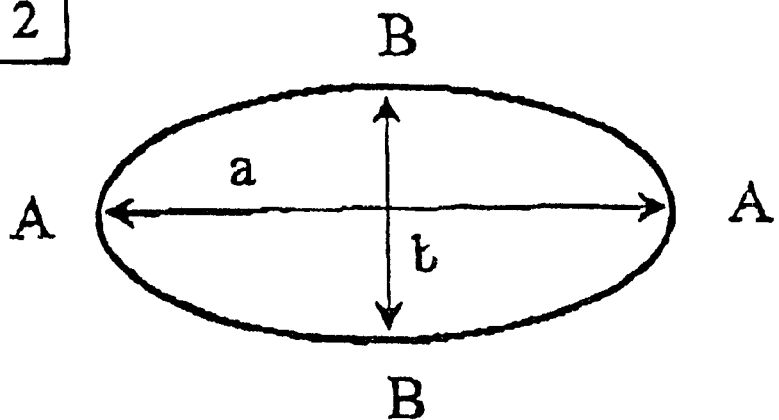
FIG. 2 is a schematic representation of an ellipsoidal adsorbent particle according to the invention.
Figure 3:
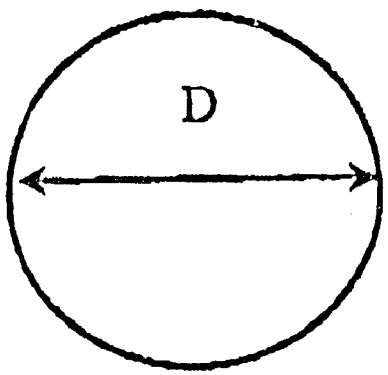
FIGS. 3 and 4 are schematic representations of spherical and cylindrical prior art adsorbent particles.
Figure 4:

The structure of such an ellipsoidal adsorbent particle according to the invention is schematically represented in FIG. 2 and, by way of comparison, the structures of spherical and cylindrical particles of the prior ar are given in FIGS. 3 and 4.

In actual fact, the adsorption kinetics involved in processes for separating gases by adsorption, such as PSA or VSA processes, which use zeolite adsorbent particles is the diffusion of the gas molecules in the macropores of the particles.

The macropores are the network of channels resulting from the aggregation of the zeolite. The average size of the macropores is usually between 0.1 $\mu$m and 10 $\mu$m.

A gas molecule starts by diffusing in the macropores before reaching the zeolite crystals where the adsorption of the molecule takes place.

The rate at which an adsorbent article takes up adsorbable gas therefore depends very closely on the structure of the macropore network and the shape of the particles.

One basic law which can be used for studying diffusion is Fick's law, namely:

$$dC/dt = -\text{div}(D.\text{grad}(C))$$

where:

C is the average local concentration in the medium where the diffusion is taking place, and D is the diffusivity of the adsorbent particle.

The consequence of this is that, for an adsorbent particle of given volume V, the average quantity Cm of adsorbable gas contained in the particle at a time t is given by:

$$Cm(t) = \iiint_V (C(t).dV)/V$$

The adsorption kinetics can therefore be characterized by considering the time response of a particle whose surroundings change suddenly from a vacuum to a fixed pressure P of the adsorbable gas.

At this pressure P, the quantity of gas adsorbed in equilibrium is $C_0$.

The variation f(t) is then addressed, which depends on the diffusivity of the macropores and the geometry of the particle, with:

$$f(t) = Cm(t)/C_0$$

A characteristic time tc is thereupon determined, such that:

$$tc \int_0^{+\infty} (1 - f(t)) \cdot dt$$

The characteristic time tc is then used to define a rate constant Cv such that:

$$Vc = 1/tc$$

By way of example, the following are considered:

a sphere of diameter D representing a spherical adsorbent particle according to the prior art (see FIG. 3), and ellipsoids (see FIG. 2) of revolution, with the same volume, and with a major axis of length a and a minor axis of length b (b=c), which are such that: $a.b^2 = D^3$.

The typical case in which the particles change at time 0 from a medium at zero pressure to a medium at fixed pressure is then addressed.

The adsorption rate is determined on the basis of a numerical integration of Fick's law which was given above.

The influence of the ratio a/b is demonstrated by the ratio of the characteristic rate constants Cv, taking the sphere of diameter D as reference.

Figure 1:
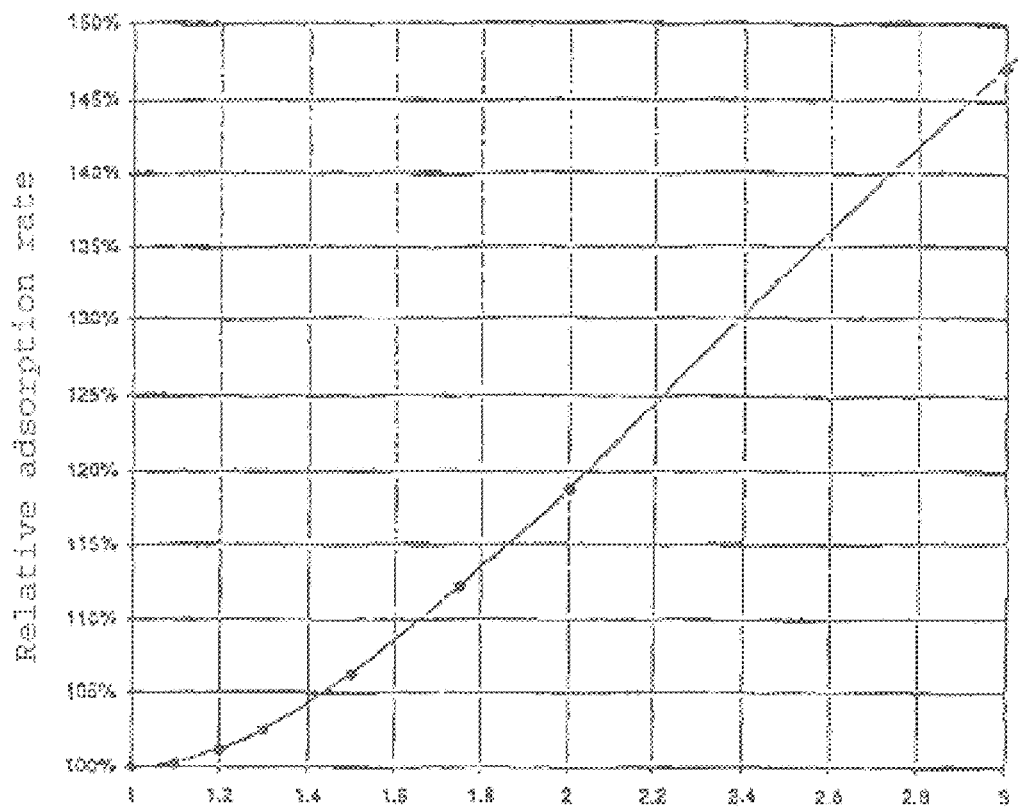
FIG. 1 is a graph depicting the influence of the ratio a/b on the relative adsorption rate.

The results obtained are given in Table I below and are represented in FIG. 1.

TABLE I

Influence of the ratio a/b on the characteristic rate

| Ratio a/b | Rate gain (in %) compared to the sphere |
|---|---|
| 1 | 0 |
| 1.1 | 0.2 |
| 1.2 | 1.1 |
| 1.3 | 2.5 |
| 1.5 | 6.3 |

TABLE I-continued

Influence of the ratio a/b on the characteristic rate

| Ratio a/b | Rate gain (in %) compared to the sphere |
|---|---|
| 1.75 | 12.1 |
| 2 | 18.7 |
| 3 | 47.1 |

It can therefore be seen that the adsorption kinetics of the adsorbent particle are improved when the ratio of a/b is increased.

Moreover, the absence of angularity on the adsorbent particle reduces the risks of attrition arising when the adsorbent particle is employed in a process of the PSA or VSA type, for example.

However, the value of the ratio a/b should not exceed about 2.5, because of the curvature of the adsorbent particle at the ends of the major axis of length a, that is to say the increase in the sensitivity to attrition, and the bending forces proportional to the ratio $a/b^2$, that is to say the increase in the breaking fragility of the adsorbent particle.

The consequence of this is that adsorbent particles defined by a ratio of a/b of between 1.05 and 2.50, approximately, are an acceptable compromise as regards the adsorption kinetics, on the one hand, and the resistance to breaking and attrition, on the other hand.

In practice, the ellipsoidal adsorbent particles according to the invention may be prepared through accretion, by ensuring rotation about an axis or, for example, by circulating cylindrical extrudates.

Figure 5:
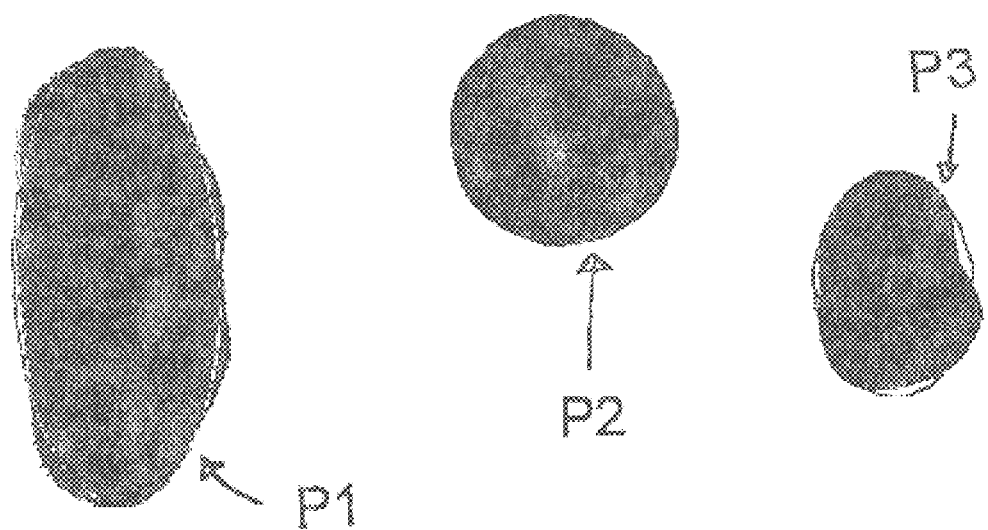
FIG. 5 shows ellipsoidal particles according to the invention, and a prior art spherical particle.

The ellipsoidal shape of the particles may be monitored by analyzing the projected surface of the particles when they are arranged on a plane surface, as schematically represented in FIG. 5.

More precisely, FIG. 5 shows that the particles P1 and P3 have a shape similar to an ellipsoid of revolution and are therefore, by virtue of this fact, in accordance with the present invention, whereas the particle P2 has a shape similar to a sphere and is therefore in accordance with the prior art.

On the basis of the projected image of the particles, as shown in FIG. 5, the elongation ratio a/b of the particles may be measured by means of a conventional type of image analysis software, for example using the Ellix™ software marketed by the Microvision™ company, which software makes it possible to calculate the moments of inertia Ia and Ib of the projected surface of the particles, and to deduce therefrom the equivalent ellipsoid of revolution of major axis a and of minor axis b (with b=c), and therefore the ratio a/b.

COMPARATIVE EXAMPLE

The zeolite adsorbent particles similar to an ellipsoid of revolution which are in accordance with the invention may be used as adsorbent in a process for separation by adsorption of gases from air, of the PSA type, in order to produce oxygen having a purity of about 93%, as shown in the following trials.

In these trials, the working conditions for a VSA process are as follows:

2 adsorbers operating in parallel
adsorption pressure: $1.4 \times 10^5$ Pa
desportion pressure: $0.4 \times 10^5$ Pa
temperature of the feed air: 35° C. approximately
production cycles: 2×40 seconds approximately.

The performance, that is to say the yield and productivity, of the VSA process which are obtained for the adsorbents A to E tested are given in Tables II and III below in the form of indexed values; the reference is the adsorbent A according to the prior art having the shape of a sphere (a=b=c).

It should furthermore be noted that adsorbents B to E are in accordance with the present invention.

The yield (expressed in %) is defined as being the ratio of the quantity of pure oxygen contained in the gas which is produced to the quantity of pure oxygen introduced via the feed air flow.

The productivity is defined as being the ratio of the flow rate of pure oxygen contained in the gas which is produced to the quantity (volume or mass) of adsorbent used for this production; the productivity is expressed in $m^3(stp)/h/m^3$ of absorbent or in $m^3(stp)/h/ton$ of absorbent.

TABLE II

Performance for a constant cycle time

| Absorbent No. | Average elongation (a/b) | Adsorption kinetics | Yield (in %) | Productivity (in %) |
|---|---|---|---|---|
| A | 1 | 100 | 100 | 100 |
| B | 1.1 | 100.2 | 100.2 | 100.3 |
| C | 1.2 | 101.1 | 100.8 | 101 |
| D | 1.5 | 106.3 | 104.1 | 105 |
| E | 2 | 118.7 | 110.7 | 113.4 |

The results obtained show that the best performance (yield and productivity) is obtained for adsorbents B to E according to the present invention.

TABLE III

Performance with decreasing cycle time and yields kept constant

| Absorbent No. | Average elongation (a/b) | Cycle time | Adsorption kinetics | Yield (in %) | Productivity (in %) |
|---|---|---|---|---|---|
| A | 1 | 100 | 100 | 100 | 100 |
| B | 1.1 | 99.8 | 100.2 | 100 | 100.2 |
| C | 1.2 | 98.9 | 101.1 | 100 | 101.1 |
| D | 1.5 | 94.1 | 106.3 | 100 | 106.3 |
| E | 2 | 84.2 | 118.7 | 100 | 118.7 |

Here again, as for Table II, the best results are obtained for the adsorbents b to e according to the present invention.

What is claimed is:

1. Aggregated adsorbent particle having a shape similar to an ellipsoid, said ellipsoid having a first axis (A—A) of length (a), a second axis (B—B) of length (b) and a third axis (C—C) of length (c), said first axis (A—A), second axis (B—B) and third axis (C—C) being orthogonal, the lengths of said first, second and third axes being such that: a>b≧c, and the ratio (a/b) of the length (a) of the first axis (A—A) to the length (b) of the second axis (B—B) being such that: 1.05<a/b<2.50.

2. The adsorbent particle according to claim 1, wherein the particle has a shape similar to an ellipsoid of revolution with b=c, substantially free from sharp edges.

3. The adsorbent particle according to claim 1, wherein the ratio (a/b) is between 1.08 and 2.

4. The adsorbent particle according to claim 1, wherein the particle contains at least one zeolite comprising an A zeolite or a faujasite, and optionally contains at least one inert binder comprising at least one clay.

5. The adsorbent particle according to claim 1, wherein the particle contains at least one faujasite exchanged with mono-, di- or trivalent alkali or alkaline earth metal cations selected from the group consisting of lithium, manganese, nickel, cobalt, barium, calcium, zinc, copper, magnesium, strontium and iron.

6. The adsorbent particle according to claim 1, wherein the particle contains at least one faujasite containing at least 85% of at least one of lithium and calcium cations.

7. The adsorbent particle according to claim 1, wherein the length (a) of the first axis (A—A) is between 0.4 mm and 3 mm, the length (b) of the second axis (B—B) is between 0.3 mm and 2.9 mm, and the length (c) of the third axis (C—C) is between 0.3 mm and 2.9 mm.

8. A Pressure Swing Adsorption process for separating a gas flow containing at least a first gaseous compound and at least a second gaseous compound, which comprises:

(a) preferentially adsorbing at least the first gaseous compound on adsorbent particles having a shape similar to an ellipsoid, said ellipsoid having a first axis (A—A) of length (a), a second axis (B—B) of length (b) and a third axis (C—C) of length (c), said first axis (A—A), second axis (B—B) and third axis (C—C) being orthogonal, the lengths of the first, second and third axes being such that: $a > b \geq c$, and the ratio (a/b) of the length (a) of the first axis (A—A) to the length (b) of the second axis (B—B) being such that: $1.05 < a/b < 2.50$; and recovering a gas flow containing predominantly the second gaseous compound.

9. The process according to claim 8, wherein the gas flow to be separated comprises nitrogen and at least one less polar gaseous compound.

10. The process according to claim 9, wherein the gas flow is air, the first gaseous compound is nitrogen, the second gaseous compound is oxygen, and the process is a vacuum swing adsorption process.

11. The process according to claim 8, wherein the gas flow to be separated is a mixture comprising hydrogen and at least one gaseous compound selected from the group consisting of carbon dioxide, carbon monoxide, nitrogen and hydrocarbons.

12. The process according to claim 11, wherein the gas flow is a synthetic gas, and the hydrocarbons comprise methane.

13. The process according to claim 8, wherein the gas flow to be separated is air comprising at least one impurity selected from the group consisting of carbon dioxide, carbon monoxide, water vapor, hydrogen and hydrocarbons.

14. The process according to claim 13, wherein the hydrocarbons comprise methane.

15. A gas separation plant for implementing a Pressure Swing Adsorption process, comprising at least one adsorber having a radial geometry, and containing at least one bed of aggregated adsorbent particles; each adsorbent article having a shape similar to an ellipsoid, said ellipsoid having a first axis (A—A) of length (a), a second axis (B—B) of length (b) and a third axis (C—C) of length (c), said first axis (A—A), second axis (B—B) and third axis (C—C) being orthogonal, the lengths of said first, second and third axes being such that: $a > b \geq c$, and the ratio (a/b) of the length (a) of the first axis (A—A) to the length (b) of the second axis (B—B) being such that: $1.05 < a/b < 2.50$.

* * * * *